United States Patent [19]
Pipan

[11] Patent Number: 5,531,297
[45] Date of Patent: Jul. 2, 1996

[54] ROPE LOCKING DEVICE

[75] Inventor: Gregory F. Pipan, Greensboro, N.C.

[73] Assignee: Harris-Johnson Industries, Inc., Greensboro, N.C.

[21] Appl. No.: 390,033

[22] Filed: Feb. 17, 1995

[51] Int. Cl.$^6$ .............................. B65H 59/16; F16G 11/00
[52] U.S. Cl. ................. 188/65.1; 188/65.2; 24/132 WL; 24/134 R
[58] Field of Search .................. 188/65.1, 65.2; 24/132 WL, 134 R, 134 L, 134 N, 134 KB, 132 AA, 115 G; 254/250, 253, 254, 264

[56] References Cited

U.S. PATENT DOCUMENTS

| | | | |
|---|---|---|---|
| 2,991,526 | 7/1961 | Kuebler | 188/65.1 X |
| 3,327,999 | 6/1967 | Mitchell | 24/134 R |
| 4,278,042 | 7/1981 | Lindquist | 188/65.2 X |
| 4,669,582 | 6/1987 | Sandreid | 188/65.1 |
| 4,790,049 | 12/1988 | Grosh | 24/132 WL |
| 5,083,350 | 1/1992 | Sandreid | 24/134 R |

FOREIGN PATENT DOCUMENTS 265357  2/1927  United Kingdom ................. 24/134 R Primary Examiner—Robert J. Oberleitner
Assistant Examiner—Kevin D. Rutherford

[57] ABSTRACT

A rope locking device and method are provided to prevent inadvertent rope movement of counterbalanced riggings as used in theaters and auditoriums. The locking device housing is rigidly supported on a floor or wall and includes a handle to manually release a handline passing therethrough as needed. Resiliently mounted jaws with teeth within the housing adjustably grip the handline and prevent slippage thereof. When there is an out-of-balance condition, the jaws grip the handline even though the manual release handle is moved to its release position.

12 Claims, 4 Drawing Sheets

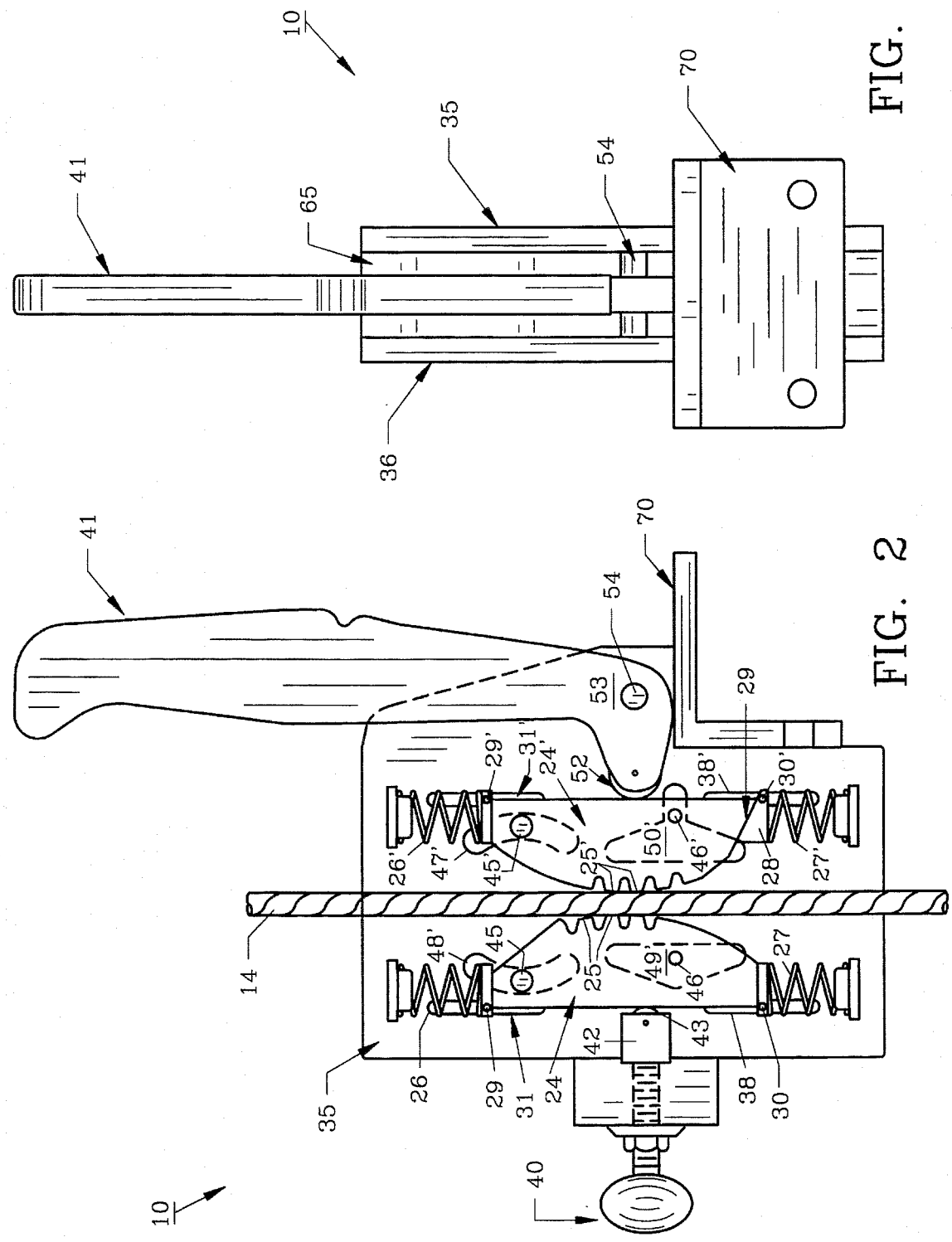

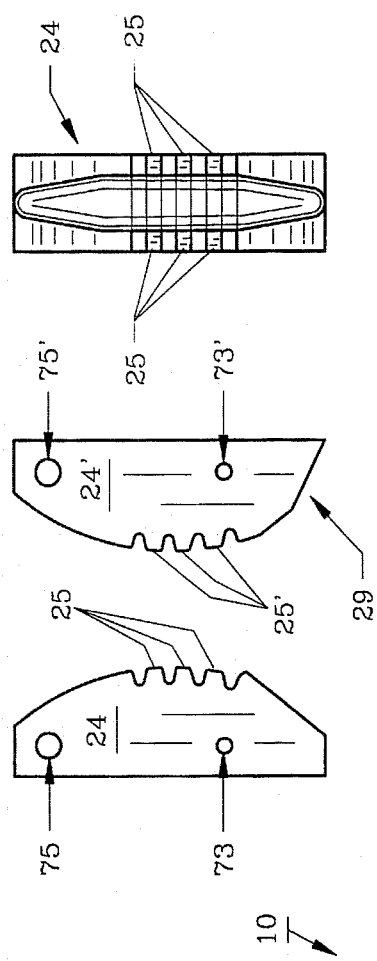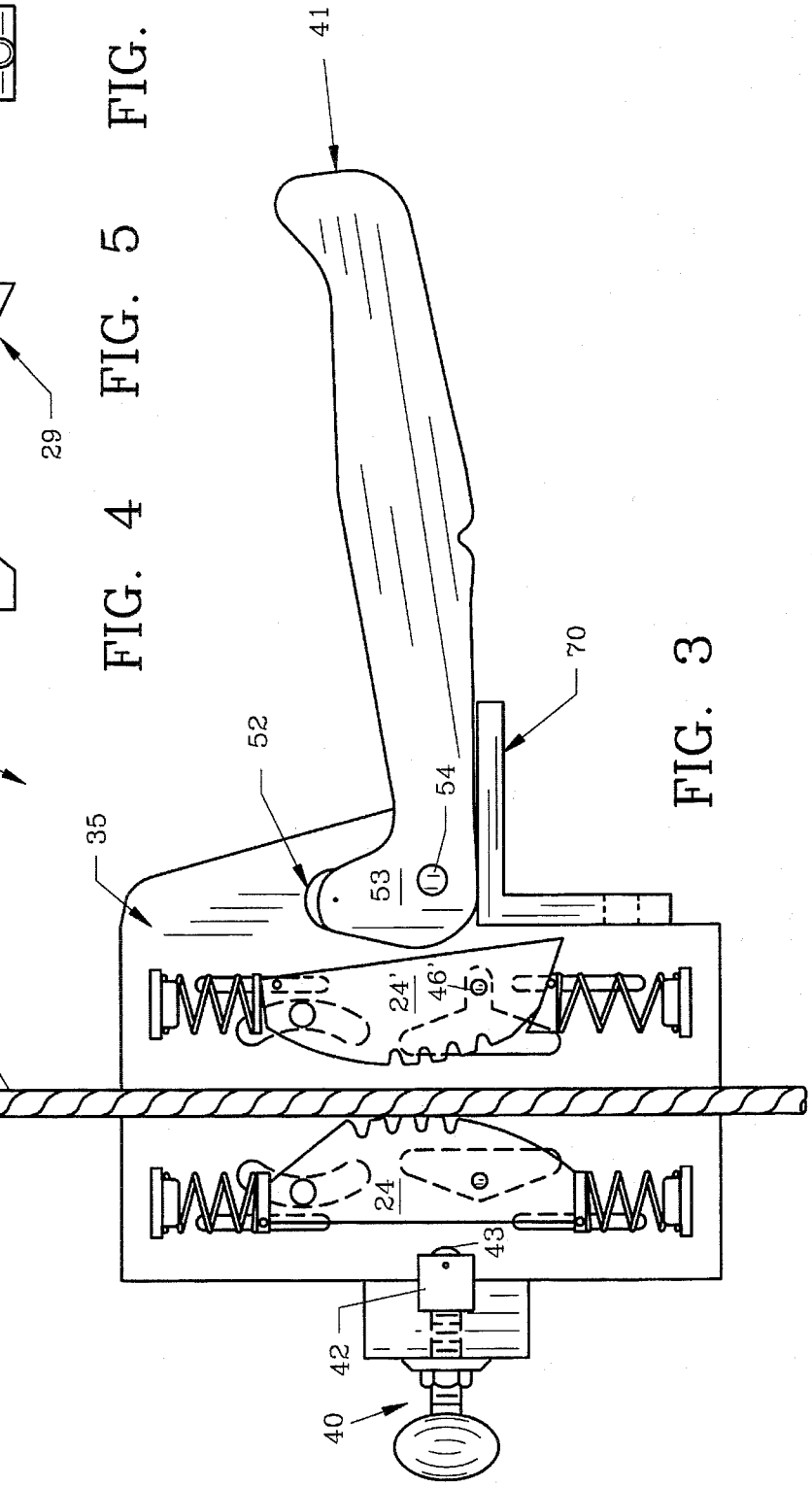

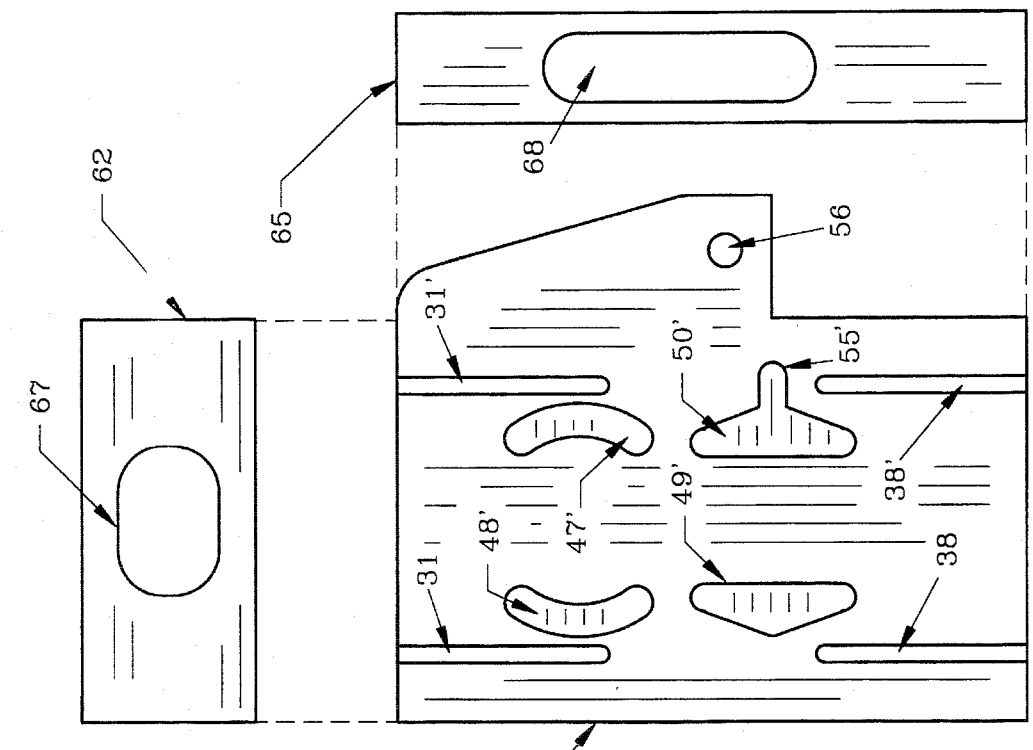
FIG. 8
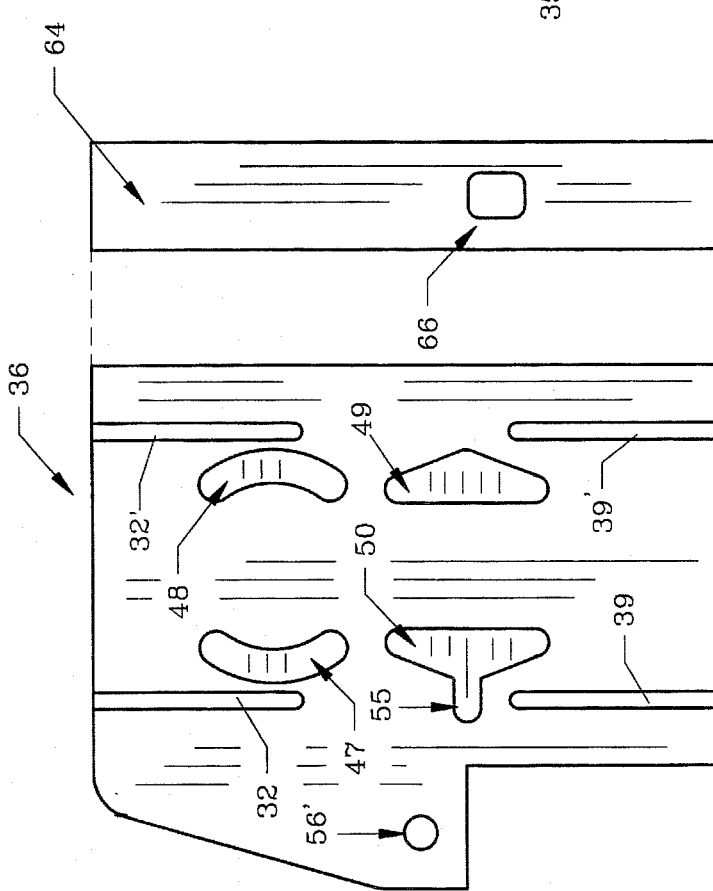
FIG. 7
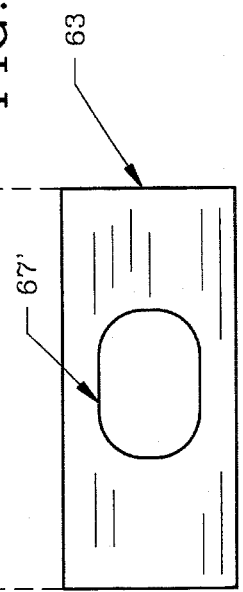

ROPE LOCKING DEVICE

BACKGROUND OF THE INVENTION

1. Field Of The Invention

The invention herein pertains to devices to grip and maintain ropes in a desired position and particularly pertains to locking ropes as are used in suspension systems for curtains, scenery, lights, and other equipment in auditoriums, coliseums, exhibit halls, theaters, and other arenas.

2. Description Of The Prior Art And Objectives Of The Invention

Various types of riggings and systems have been used in the past to raise, lower, and suspend scenery, curtains, lighting equipment, audio devices, cameras, and other equipment for theatrical productions, displays, exhibitions, and other events. A counterweight rigging is popular for the theater industry and is comprised of certain components including a head block, a counterweight arbor, a floor block, a rope lock, loft blocks, a pipe batten, lift lines (aircraft cables), and a rope handline.

A counterweight rigging is used to lift objects overhead on a stage or other location. An item that is to be lifted is attached to the pipe batten on stage and an equal amount of counterweight is added to the counterweight arbor. The counterweight arbor, in this balanced condition, is able to be moved with a minimum of effort by pulling on the handline. The rope lock is an essential component in that it is used to hold (lock) the handline when the counterweight set is not in use.

Should an item be attached to the pipe batten and no additional weight added to the counterweight arbor, the rigging would be out of balance. When the rigging is used in this condition, the operator, after releasing the rope lock, may not be able to control the ascent or descent of the pipe batten. When the rope lock is released, the out-of-balance rigging will start to travel without the assistance of the operator and the operator may not be able to stop the rigging from "running away", continuing its descent until the overbalanced side of the counterweight rigging strikes a stop or other obstacle in its path.

As a solution to the problems often encountered with such counterweight rigged systems, a present invention was conceived and one of its objectives is to provide a rope locking device which will prevent an out-of-balance counterweight rigging from movement, even if the rope handle has been moved to a release position by the operator.

It is another objective of the new invention to provide a rope locking device which includes a manual release handle to allow the rope of a properly balanced counterweight rigging to pass freely through the locking device when desired.

It is still another objective of the present invention to provide a rope locking device which is rigidly mounted to a floor, wall, or other structure.

It is yet another objective of the present invention to provide a rope locking device which includes a pair of resiliently mounted, opposing jaws having lateral grooved surfaces which tenaciously grip the rope.

It is also an objective of the present invention to provide a rope locking device having a convenient means to adjust the tension of the jaws on the rope as needed.

SUMMARY OF THE INVENTION

A rope locking device is provided to prevent inadvertent slippage and resulting accidents during loading, unloading, or operation of theatrical type rope suspended scenery apparatus. The locking device housing which has a top, bottom, front, rear, and side walls is positioned on a fixed support and includes therein a pair of opposingly mounted rope gripping jaws. The housing allows a rope to pass therethrough which is selectively held by the jaws at a desired point therealong. A release handle exterior of the housing allows manual release of the rope when the counterweight rigging is in a balanced condition. A means to adjust the tension of the jaws against the rope is provided along with coil springs within the housing to allow the jaws to remain in an equalized position when the counterweight rigging is in balance, and to move to the locking position when the counterweight rigging is out of balance, either above or below the locking device, thereby causing the jaws therein to rotate, resulting in a tighter grip on the rope.

BRIEF DESCRIPTION OF THE DRAWINGS

FIG. 2 demonstrates a side view of the interior of the locking device with the housing mostly removed;

FIG. 2A depicts a rear view of the locking device as unattached;

FIG. 3 pictures the interior of the locking device as seen in FIG. 2 with the jaws open and the release handle in a downward or released posture;

FIG. 4 shows a side view of the left jaw of the locking device removed from the housing;

FIG. 5 demonstrates a side view of the right jaw of the locking device removed from the housing; and FIG. 6 depicts a front view of the left jaw to illustrate the rope goove therein;

FIG. 7 shows a plan view of the right side housing plate with the front and bottom housing plates exploded therefrom in plan view; and FIG. 8 illustrates the left side housing plate with the top housing plate and the rear housing plate exploded therefrom and in plan view.

DETAILED DESCRIPTION OF THE PREFERRED EMBODIMENT AND OPERATION OF THE INVENTION

Figure 1:
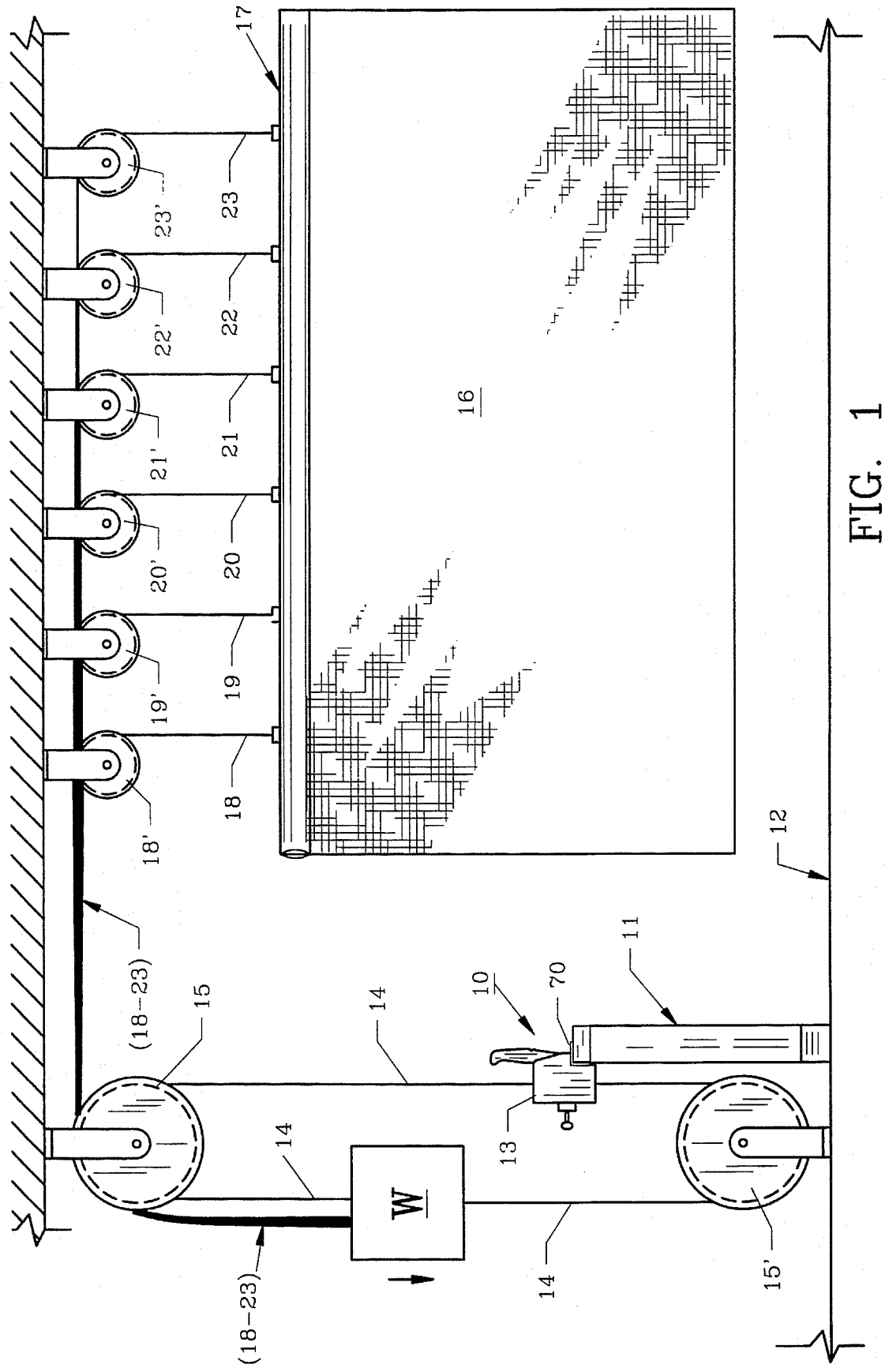
FIG. 1 illustrates a schematic representation of the locking device of the invention as positioned on conventional theatrical counterweight rigging.

Turning now to the drawings, FIG. 1 demonstrates the preferred form of the invention with locking device 10 featured in a conventional counterweight rigging for suspending scenery 16 held by pipe batten 17. Preferred rope locking device 10 is secured to floor 12 by floor support 11 attached to L-shaped bracket 70. Support 11 may consist of a steel frame, for example, bolted to floor 12. As seen, rope handline 14 passes over head block 15, and floor block 15' and loops around to affix to counterweight arbor W which approximates the combined weight of pipe batten 17 and scenery 16. As would be understood, with counterweight arbor W lowered near floor block 15', scenery 16 would be raised, for example out of view of seated theatrical patrons. If counterweight arbor W is positioned approximately midway between blocks 15, 15', scenery 16 is in full view, and if counterweight arbor W is raised proximate head block 15, scenery 16 would be at least in part on floor 12 and stagehands could then easily remove scenery 16 from suspension bar 17.

It is not unusual when stagehands work with conventional counterweight riggings that curtains, scenery, and the like are removed from pipe battens competely. Thus, if not re-balanced, with the rope lock in the release position, the counterweight arbor will fall without resistance. Such unimpeded descent can cause injury to both workers and equipment and therefore rope locking device 10 is necessary to prevent a potential accident. Counterweight arbor W as shown in FIG. 1 can be placed proximate block 15 with locking device 10 in its locked position with handle 41 in the upward position in place on handline 14. Thus, if workers now totally remove scenery 16, without adjusting the weight of counterweight arbor W, the rigging will be out of balance. If handle 41 of locking device 10 is inadvertently pulled downwardly with the counterweight rigging out of balance, movement of rope handline 14 will still be prevented by locking device 10 due to the rotation of jaws 24, 24' into handline 14 and counterweight arbor W will not fall. New scenery, curtains, or the like can be placed on pipe batten 17 balancing the rigging and handline 14 then released, by operation of the manually operated release handle 41 which will then allow handline 14 to move under control through housing 13. As further seen in FIG. 1, individual cables 18–23 are guided by loft blocks 18'–23' and pass around head block 15 where they attach atop counterweight arbor W. Rope handline 14 attaches to the top and bottom of counterweight arbor W as illustrated.

In FIG. 2, the inside workings of rope locking device 10 are shown with housing 13 mostly removed. Housing 13, as seen in FIG. 2A consists of right side plate 35, left side plate 36, top plate 62, bottom plate 63, front plate 64, and rear plate 65, all formed from three-eighths (⅜) inch (9.525 mm) planar steel as illustrated more fully in FIGS. 7 and 8. Jaws 24, 24' opposingly grip handline 14 to lock it in place as teeth 25, 25' contact and slightly penetrate handline 14 which consists of a three-quarter inch (19.05 mm) rope. Jaws 24, 24' are resiliently mounted within housing 13 by upper coil springs 26, 26' and lower coil springs 27, 27'. Coil spring 27' is fitted with a biased plate 28 to engage bottom surface 29 of jaw 24', as better seen in FIG. 5. Vertical alignment of coil springs 26, 26', 27, and 27' are maintained respectively by upper coil guide pins 29, 29' which slide in upper guide grooves 31, 31', and 32, 32' formed in housing side plate 35 and 36. Lower coil spring guide pins 30, 30' likewise slide in lower guide grooves 38, 38' and 39, 39' of housing slide plates 35, 36 respectively. Depending on the size of the rope (such as handline 14) to be retained within housing 13, threaded jaw adjusting member 40 is employed which is affixed to housing 13 and contacts slide 42 containing roller 43 which in turn contacts jaw 24, urging it inwardly for a small diameter rope, or allowing jaw 24 outward movement for a larger diameter rope handline.

In FIG. 2A, a rear view of rope locking device 10 is seen with release handle 41 shown in a closed or upward posture. Once handline 14 has been positioned in housing 13 between jaws 24, 24' and jaw 24 suitably tightened thereagainst by jaw adjusting member 40, with release handle 41 in an upright position as shown in FIG. 2, movement of handline 14 within housing 13 is prevented. Thus, if scenery 16 should suddenly break and fall from pipe batten 17 counterweight arbor W would remain in its preset position. If an excessive vertical force is applied to handline 14 and release handle 41 is moved from the upward and locked position to the downward position, jaws 24, 24' will continue to lockably engage handline 14 and prevent the movement of handline 14 and counterweight arbor W. If handle 41 is pulled downwardly while an excessive upward force is applied to handline 14 (FIG. 2), jaws 24, 24' will rotate in respectively, counterclockwise and clockwise directions, thereby gripping handline 14 more intensely with teeth 25, 25'. If, on the other hand, a downward force were applied to the section of handline 14 shown in FIG. 2, jaws 24, 24' would rotate in respectively, clockwise and counterclockwise directions, likewise gripping handline 14 more tightly and preventing handline 14 movement. The clockwise/counterclockwise rotation of jaws 24, 24' is a result of pivotable jaw movement about axles 45, 45', which pass through axle shafts 75, 75' respectively, of jaws 24, 24' and rest in arcuate grooves 47, 47', 48, 48' of housing side plates 35, 36. As shown in FIGS. 7 and 8, arcuate grooves 47, 47', 48, 48' may be, for example, three-sixteenths (3/16) of an inch (4.76 mm) deep as side plates 35, 36 may be, for example, three-eighths (⅜) inches (9.525 mm) thick, formed of steel. As would be understood, jaw axle 45 rides in arcuate grooves 48, 48' whereas jaw axle 45' rides in arcuate grooves 47, 47'. Lower jaw axles 46, 46' reside in right housing side plate 35 grooves 49', 50' and left housing side plate 36 grooves 49, 50 respectively, as seen in FIGS. 7 and 8. Jaw 24' accomodates axle pin 46' in lower axle pin 73', axle pin 46' which is contained within lower triangular guide grooves 50, 50' as shown in FIGS. 2 and 7. Jaw 24 accommodates, within lower axle pin shaft 73 defined therein, axle pin 46 which is contained within triangular guide grooves 49, 49'.

In FIG. 3, release handle 41 is depicted in a downward or open posture, whereby jaw 24' is released from handline 14 as handle roller 52 of handle 41 has rotated clockwise, away from jaw 24. As shown, roller 52 is positioned on release handle head 53, and release handle 41 is pivotally attached to housing 13 by handle axle 54. As further seen in FIGS. 7 and 8, handle axle 54 is mounted in housing right side plate 35 in opening 56 and through opening 56' in left housing side plate 36. Triangular grooves 50, 50' have an elongated, horizontal portion 55, 55' respectively. Elongated portions 55, 55' allow lower jaw axle 46' to move laterally therein, towards handle 41 as seen in FIG. 3, to allow extra clockwise rotation of jaw 24' as may be required for heavy or thick ropes, for ease in loading or unloading such ropes through housing 13 and to allow sufficient rope movement when handle 41 is open (in a downward posture). Rope as used herein may comprise hemp, nylon, or otherwise as suitable under the particular circumstances encountered.

In FIG. 7, front housing plate 64 has an opening 66 through which jaw adjusting member 40 passes. When housing 13 is assembled, housing top plate 62 (FIG. 8) and housing bottom plate 63 having openings 67, 67' respectively for passage of handline 14 which may be of a conventional hemp rope, a nylon rope or otherwise. Rear housing plate 65 defines elongated opening 68 to accomodate rotational movement of release handle 41. Top plan views of housing plates 35, 36, 62–65 are featured in FIGS. 7 and 8 for clarity, and which could be secured together by bolts, screws, weldments, or otherwise as desired.

The illustrations and examples provided herein are for explanatory purposes and are not intended to limit the scope of the appended claims.

I claim:

1. A rope locking device comprising: a housing, first and second opposing jaws, said jaws each having a top and a bottom, said jaws contained within said housing for engaging a rope passing therebetween, a means to adjust the tension of said jaws against the rope, said tension adjusting means positioned on said housing and in contact with said first jaw, a rope release handle, said release handle pivotally mounted on said housing to close said jaws, a first resilient member, said first resilient member contiguous to the top of said first jaw, and a second resilient member, said second resilient member in vertical alignment with said first resilient member, said second resilient member contiguous to the bottom of said first jaw.

2. A rope locking device as claimed in claim 1 and including a third resilient member, said third resilient member contiguous with the top of said second jaw.

3. A rope locking device as claimed in claim 2 wherein said bottom surface of said second jaw is biased, a cam slide, said cam slide affixed to said third resilient member, said cam slide for engaging said biased bottom surface to maintain desired vertical alignment of said second jaw.

4. A rope locking device as claimed in claim 1 and including a mounting support, said mounting support attached to said housing.

5. A rope locking device as claimed in claim 1 wherein said housing defines a plurality of opposing guide grooves, said guide grooves positioned interiorly thereof.

6. A rope locking device as claimed in claim 1 wherein said jaws each define an axle shaft, a pair of guide axles, each of said guide axles mounted within one of said axle shafts for guiding said jaws within said housing.

7. A rope locking device as claimed in claim 1 wherein said jaws are grooved.

8. A rope locking device comprising: a housing, said housing having interior walls defining opposing guide grooves, first and second jaws, said jaws each having a top and a bottom, said jaws opposingly mounted within said housing to engage a rope passing therethrough, said jaws each defining an axle shaft, a pair of guide axles, one of said axles contained within each of said jaw axle shafts, said guide axles positioned within said housing wall guide grooves, a first resilient member, said first resilient member contiguous to the top of said first jaw, a second resilient member, said second resilient member contiguous with the bottom of said second jaw, and a release handle, said release handle mounted on said housing to manually open and close said jaws.

9. The rope locking device of claim 8 and including a means to adjust the tension of said jaws.

10. The rope locking device of claim 8 wherein one of said guide grooves is arcuately shaped.

11. The rope locking device of claim 8 and including a lower jaw guide groove, said lower guide groove having an elongated portion, said lower guide groove defined in said housing interior wall.

12. The rope locking device of claim 8 and including a means to adjust the tension of said first jaw, said tension adjusting means contained within said housing and contacting said first jaw.

* * * * *